United States Patent [19]

Nagai

[11] Patent Number: 4,486,897
[45] Date of Patent: Dec. 4, 1984

[54] TELEVISION RECEIVER FOR DEMODULATING A TWO-LANGUAGE STEREO BROADCAST SIGNAL

[75] Inventor: Kunio Nagai, Kanagawa, Japan
[73] Assignee: Sony Corporation, Tokyo, Japan
[21] Appl. No.: 463,813
[22] Filed: Feb. 4, 1983
[30] Foreign Application Priority Data Feb. 9, 1982 [JP] Japan ............................ 57-16613[U]

[51] Int. Cl.$^3$ .......................... H04N 5/60; H04H 5/00
[52] U.S. Cl. ....................................... 381/2; 358/144; 358/198
[58] Field of Search ............................... 358/142–144, 358/198; 381/2, 27

[56] References Cited

U.S. PATENT DOCUMENTS 3,679,832  7/1972  Halpern ............................. 381/27 X
4,302,837  11/1981 Tanaka et al. ..................... 358/44 X
4,405,834  9/1983  Buhse et al. ............................. 381/2
4,405,944  9/1983  Eilers et al. ......................... 358/144

*Primary Examiner*—R. J. Hickey
*Attorney, Agent, or Firm*—Lewis H. Eslinger; Alvin Sinderbrand

[57] ABSTRACT

Apparatus for demodulating a multiplexed sound signal comprised of a first sound signal formed by the sum of a left channel signal and a right channel signal in a first language, a second sound signal formed by the difference of the left channel signal and the right channel signal, and a third sound signal in a second language, comprising a single demodulation circuit for producing either the second sound signal or third sound signal in response to the multiplexed sound signal; a selector switch for selectively changing the center frequency of the demodulation circuit to control the latter to produce either the second sound signal or third sound signal in response to the multiplexed sound signal; a matrix circuit for producing a stereo sound signal in response to the first and second sound signals; a pair of output terminals; and a switch device for supplying the third sound signal as a second language monaural sound signal from the demodulation circuit to one output terminal when the selector switch controls the demodulation circuit to produce the third sound signal and for supplying the stereo sound signal to both output terminals from the matrix circuit as a first-language stereo signal when the selector switch controls the demodulation circuit to produce the second sound signal.

7 Claims, 3 Drawing Figures

FIG.1
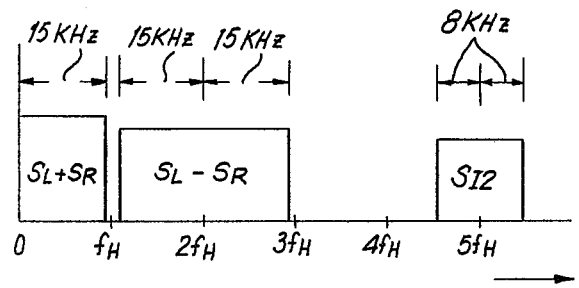
FIG.2
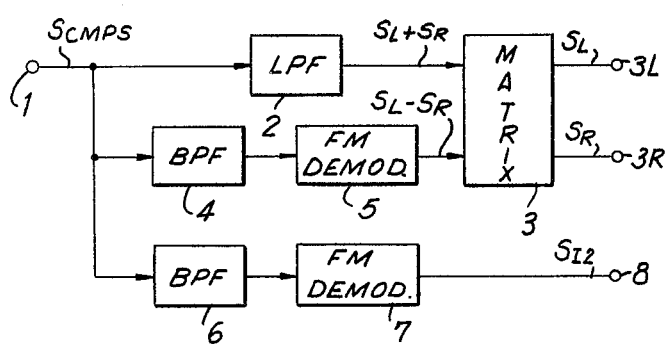
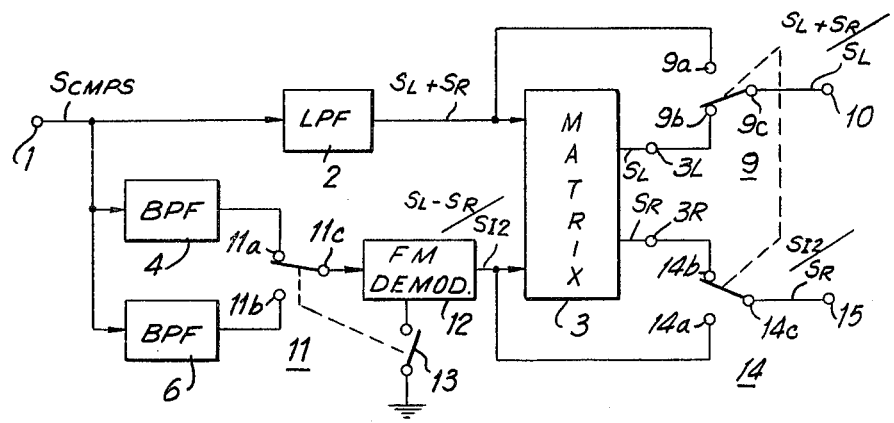
FIG.3

TELEVISION RECEIVER FOR DEMODULATING A TWO-LANGUAGE STEREO BROADCAST SIGNAL

BACKGROUND OF THE INVENTION

This invention relates generally to television receiving apparatus and, more particularly, is directed to a television receiving apparatus for reproducing a sound broadcast in two languages.

In many cases, it is desirable to produce a television broadcast in different languages. This is particularly important in a country in which, for example, two languages are spoken. For example, in a country in which English and Spanish are spoken, it may be desirable to reproduce a television broadcast of a football game in either the English language or the Spanish language.

In accordance with one proposed system, a television receiver is provided for reproducing stereo sound in a first language and monaural sound in a second language in a two language broadcast. In such case, the transmitted television signal includes a multiplexed sound broadcast signal comprised of a main sound signal formed by the sum of a left channel sound signal and right channel sound signal in the first language, for example, the English language, a second sound sub-signal formed by the difference of the left channel sound signal and right channel sound signal in the English language and a third monaural sound signal in a second language, for example, in the Spanish language. A matrix circuit is provided for combining the sum signal and difference signal in the English language to provide the left channel sound signal and right channel sound signal at respective outputs thereof as a stereo sound signal in the English language. The third sound signal is independently separated from the multiplexed sound broadcast signal and supplied to an output as a monaural sound signal in the second language.

However, with such proposed system, an FM demodulation circuit is provided in a first path for producing the difference signal in response to the multiplexed sound broadcast signal and which is supplied to the matrix circuit, and a second FM demodulation circuit is provided in still another path for producing the third sound signal in response to the multiplexed sound broadcast signal. The use of two FM demodulation circuits, however, is relatively inefficient, complex and expensive.

OBJECTS AND SUMMARY OF THE INVENTION

Accordingly, it is an object of this invention to provide apparatus for demodulating a multiplexed sound broadcast signal that avoids the above-described difficulties encountered with the aforementioned proposed system.

More particularly, it is an object of this invention to provide apparatus for demodulating a multiplexed sound signal to provide either stereo sound in a first language or monaural sound in a second language in a two language broadcast by using a single FM demodulation circuit.

In accordance with an aspect of this invention, apparatus for demodulating a multiplexed sound signal comprised of a first sound signal formed by the sum of a first channel signal and a second channel signal, a second sound signal formed by the difference of the first channel signal and second channel signal, and a third sound signal, comprising demodulation means for producing one of the second sound signal and third sound signal in response to the multiplexed sound signal; selector means for selectively controlling the demodulation means to produce one of the second sound signal and third sound signal in response to the multiplexed sound signal; matrix means for producing a stereo sound signal in response to the first and second sound signals; output means; and switching means for supplying the third sound signal to the output means when the selector means controls the demodulation means to produce the third sound signal and for supplying the stereo sound signal to the output means when the selector means controls the demodulation means to produce the second sound signal.

The above, and other, objects, features, and advantages of the present invention will become readily apparent in the following detailed description of an illustrative embodiment thereof which is to be read in connection with the accompanying drawings.

BRIEF DESCRIPTION OF THE DRAWINGS

FIG. 1 is a schematic diagram illustrating the frequency spectrum of the different signals transmitted during a two language broadcast;

FIG. 2 is a block diagram of previously proposed apparatus for demodulating a multiplexed sound signal to produce a stereo sound signal in a first language and a monaural sound signal in a second language; and FIG. 3 is a block diagram of apparatus for demodulating a multiplexed sound signal according to one embodiment of the present invention.

DETAILED DESCRIPTION OF A PREFERRED EMBODIMENT

Referring to the drawings in detail, and initially to FIG. 1 thereof, there is shown therein the frequency spectrum of a proposed multiplexed sound broadcast signal comprised of a first main signal formed by the sum $(S_L+S_R)$ of a first-language left channel signal $S_L$ and right channel signal $S_R$, and which may have a bandwidth between 0 Hz and 15 KHz. For example, the first language may be the English language, and hereinafter, for ease in understanding to invention, the first language will be referred to as the English language. The multiplexed sound broadcast signal also includes a second sub-sound signal formed by frequency modulating (FM) or amplitude modulating (AM) a carrier having a frequency twice that of the horizontal deflection frequency $f_H$ with the difference $(S_L-S_R)$ of the English language left channel signal $S_L$ and right channel signal $S_R$, and having a bandwidth of 30 KHz. The multiplexed sound broadcast signal also includes a third sound signal corresponding to a transmitted second language. The third sound signal is formed by frequency modulating a carrier having a frequency $5f_H$ by a signal $S_{l2}$, and having a bandwidth of 16 KHz. For example, the second language may be the Spanish language, and hereinafter, for ease in understanding the invention, the second language will be referred to as the Spanish language. It is to be appreciated that it is only necessary that the modulated carrier of the third sound signal have a frequency band which does not interfere with that of the second sub-sound signal, that is, the carrier may have a frequency of $4.5f_H$ or the like.

In accordance with a previously proposed system shown in FIG. 2, the multiplexed sound broadcast signal comprised of the aforementioned sound signals can be demodulated to provide stereo sound in the English language or monaural sound in the Spanish language. Thus, for example, when a football game is broadcast in the English language, and also in a second language, such as Spanish, the system of FIG. 2 provides for the separate stereo listening of the English language broadcast or monaural listening of the Spanish language broadcast, without the other broadcast being heard.

More particularly, with the previously proposed system shown in FIG. 2, the multiplexed sound broadcast signal $S_{CMPS}$ is supplied from an input terminal 1 to a low pass filter (LPF) to produce the first sound signal formed by the sum $(S_L+S_R)$ of the English-language left channel signal $S_L$ and right channel signal $S_R$ and which is supplied to a matrix circuit 3. The multiplexed sound broadcast signal $S_{CMPS}$ is also supplied from input terminal 1 through a band pass filter (BPF) 4 having a center frequency of, for example, $2f_H$, and an FM demodulation circuit 5 for producing the second sound sub-signal or difference signal $(S_L-S_R)$ which is also supplied to matrix circuit 3. In response thereto, matrix circuit 3 supplies an English-language left channel sound signal $S_L$ to an output terminal 3L thereof and an English-language right channel sound signal $S_R$ to an output terminal 3R thereof. More particularly, left channel sound signal $S_L$ and right channel sound signal $S_R$ are produced by matrix circuit 3 in accordance with the following operations:

$$(S_L+S_R)+(S_L-S_R)=2S_L \quad (1),$$

$$(S_L+S_R)-(S_L-S_R)=2S_R \quad (2).$$

In this manner, stereo sound in the English language can be produced by loudspeakers supplied with the left channel sound signal $S_L$ and right channel sound signal $S_R$ from ouput terminals 3L and 3R, respectively.

In addition, multiplexed sound broadcast signal $S_{CMPS}$ from input terminal 1 is supplied through a band pass filter (BPF) 6 having a center frequency of, for example, $5f_H$, for separating the third sound signal therefrom, and which is then supplied to an FM demodulation circuit 7 where it is FM demodulated to produce sound signal $S_{I2}$ at an output terminal 8. In this manner, third sound signal $S_{I2}$, when supplied to a loudspeaker, results in a monaural sound in the second or Spanish language. However, it is to be appreciated that, with the arrangement shown in FIG. 2, two FM demodulation circuits, namely, FM demodulation circuits 5 and 7 are provided in separate paths to separately produce difference signal $(S_L-S_R)$ and third sound signal $S_{12}$. In such case, it is inefficient to utilize two FM demodulation circuits and is also relatively complex and expensive.

In accordance with the present invention, a single FM demodulation circuit is provided for producing difference signal $(S_L-S_R)$ or third sound signal $S_{I2}$. More particularly, apparatus for demodulating a multiplexed sound broadcast signal according to one embodiment of the present invention is shown in FIG. 3, in which elements corresponding to those previously described in regard to the apparatus of FIG. 2 are identified by the same reference numerals and a detailed description thereof will be omitted herein for the sake of brevity. As shown therein, multiplexed sound broadcast signal $S_{CMPS}$ is supplied from input terminal 1 through LPF 2 which, in turn, supplies sum signal $(S_L+S_R)$ to matrix circuit 3. In addition, sum signal $(S_L+S_R)$ is supplied to a first input contact 9a of a switch 9 which has a movable arm connected between first input contact 9a and a second input contact 9b thereof, the latter input contact 9b being supplied with left channel sound signal $S_L$ from output terminal 3L of matrix circuit 3. Accordingly, switch 9 supplies sum signal $(S_L+S_R)$ through input contact 9a and an output terminal 9c thereof as an English-language monaural sound signal to an output terminal 10, or supplies left channel sound signal $S_L$ from output terminal 3L of matrix circuit 3 through input contact 9b and output terminal 9c of switch 9 to output terminal 10.

Multiplexed sound broadcast signal $S_{CMPS}$ from input terminal 1 is also supplied through BPF 4 having a center frequency of, for example, $2f_H$ to an input contact 11a of a switch 11, and through a BPF 6 having a center frequency of, for example, $5f_H$, to an input contact 11b of switch 11. Switch 11 includes an arm movable between either fixed contact 11a or 11b for supplying the output signals from BPFs 4 or 6 through an output terminal 11c of switch 11 to an FM demodulation circuit 12. A switch 13 is connected between ground and one input of FM demodulation circuit 12 for changing the center frequency of FM demodulation circuit 12. More particularly, switch 13 is ganged with switch 11 such that, when the movable arm of switch 11 is connected with fixed contact 11a, the output signal from BPF 4 is supplied to FM demodulation circuit 12, and switch 13 is in a first condition, for example, the open position shown in FIG. 3, to adjust the center frequency of FM demodulation circuit 12 so that the latter produces the difference signal $(S_L-S_R)$. On the other hand, when the movable arm of switch 11 is connected with fixed contact 11b, the output signal from BPF 6 is supplied to FM demodulation circuit 12, and switch 13 is in another position, for example, a closed position, to change the center frequency of FM demodulation circuit 12 so that the latter produces the third sound signal $S_{I2}$.

The output signal from FM demodulation circuit 12, namely, difference signal $(S_L-S_R)$ or third sound signal $S_{I2}$ from FM demodulation circuit 12, is supplied to matrix circuit 3 or a first input contact 14a of a switch 14. Switch 14 includes an arm movable between first input contact 14a or a second input contact 14b thereof which is supplied with right channel sound signal $S_R$ from output terminal 3R of matrix circuit 3. In this manner, either third sound signal $S_{I2}$ is supplied through first input contact 14a and an output terminal 14c of switch 14 to an output terminal 15 as a Spanish language monaural sound signal, or right channel sound $S_R$ is supplied through second input contact 14b and output terminal 14c of switch 14 to output terminal 15. It is to be appreciated that, the movable arms of switches 9 and 14 are ganged so that when the movable arm of switch 9 is connected to input contact 9b, the movable arm of switch 14 is connected with input contact 14b. In this manner, the English-language left channel sound signal $S_L$ is supplied to output terminal 10, while the English-language right channel sound signal $S_R$ is supplied to output terminal 15 and together constitute an English-language stereo sound signal. At such time, it is to be appreciated that the movable arm of switch 11 is connected to input contact 11a thereof and switch 13 is in its open position.

On the other hand, when the movable arm of switch 11 is connected with input contact 11b and switch 13 is in its closed position, FM demodulation circuit 12 produces the third sound signal $S_{I2}$. At such time, the movable arms of switches 9 and 14 are connected with input contacts 9a and 14a, respectively, so that sum signal $(S_L+S_R)$ is supplied as an English-language monaural sound signal to output terminal 10, while third sound signal $S_{I2}$ is supplied to output terminal 15 as a Spanish-language monaural sound signal. It is to be noted that the situation is extremely rare in which it is desired to produce a stereo sound signal in a first language and monaural sound signal in a second language, as produced by the previously proposed system shown in FIG. 2. With the present invention, on the other hand, either an English-language stereo signal is produced, or an English-language and Spanish-language monaural signal is produced. The present invention overcomes the deficiency of the previously proposed system shown in FIG. 2 by providing a single FM demodulation circuit 12, thereby reducing the complexity and cost of the circuit.

It is to be appreciated that various modifications can be made to the present invention by one of ordinary skill in the art within the scope of the present invention. For example, BPFs 4 and 6 can be combined into a single band pass filter with a variable pass band, thereby eliminating switch 11. Further, semiconductor switches can be used in place of the mechanical switches shown in the drawings.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for demodulating a multiplexed sound signal comprised of a first sound signal formed by the sum of a first channel signal and a second channel signal, a second sound signal formed by the difference of said first channel signal and said second channel signal, and a third sound signal, comprising:

demodulation means for producing one of said second sound signal and third sound signal in response to said multiplexed sound signal;

selector means for selectively controlling said demodulation means to produce one of said second sound signal and third sound signal in response to said multiplexed sound signal;

matrix means for producing a stereo sound signal in response to said first and second sound signals;

output means; and switch means for supplying said third sound signal to said output means when said selector means controls said demodulation means to produce said third sound signal and for supplying said stereo sound signal to said output means when said selector means controls said demodulation means to produce said second sound signal.

2. Apparatus according to claim 1; in which said selector means selectively changes the center frequency of said demodulation means to control the latter to produce one of said second sound signal and said third sound signal.

3. Apparatus according to claim 2; further including first filter means for separating a first portion of said multiplexed sound signal corresponding to said second sound signal and second filter means for separating a second portion of said multiplexed sound signal corresponding to said third sound signal; and in which said demodulation means is supplied with one of said first portion and said second portion of said multiplexed sound signal.

4. Apparatus according to claim 3; further including second switch means for supplying one of said first portion and second portion of said multiplexed sound signal to said demodulation means; and in which said selector means controls said demodulation means to produce said second sound signal when said second switch means supplies said first portion of said multiplexed sound signal to said demodulation means and controls said demodulation means to produce said third sound signal when said second switch means supplies said second portion of said multiplexed sound signal to said demodulation means.

5. Apparatus according to claim 1; in which said switch means includes a first switch for supplying a first channel signal of said stereo sound signal from said matrix means to said output means, and a second switch for supplying one of a second channel signal of said stereo sound signal from said matrix means and said third sound signal from said demodulation means to said output means.

6. Apparatus according to claim 5; in which said first switch and second switch operate in synchronism with each other.

7. Apparatus according to claim 5; in which said output means includes a first output and a second output; and said first switch supplies said first sound signal to said first output when said second switch supplies said third sound signal to said second output, and said first switch supplies said first channel signal of said stereo sound signal to said first output when said second switch supplies said second channel signal of said stereo sound signal to said second output.

* * * * *